United States Patent [19]
Koehlert et al.

[11] Patent Number: 6,071,486
[45] Date of Patent: Jun. 6, 2000

[54] PROCESS FOR PRODUCING METAL OXIDE AND ORGANO-METAL OXIDE COMPOSITIONS

[75] Inventors: Kenneth C. Koehlert, Champaign, Ill.; Douglas M. Smith, Albuquerque, N.Mex.; William C. Ackerman, Champaign, Ill.; Stephen Wallace, Albuquerque, N.Mex.; David J. Kaul, Champaign, Ill.

[73] Assignee: Cabot Corporation, Boston, Mass.

[21] Appl. No.: 08/831,564

[22] Filed: Apr. 9, 1997

[51] Int. Cl.[7] .............................. C01B 15/14; C01B 33/12
[52] U.S. Cl. ........................ 423/335; 423/325; 423/336; 423/604; 423/605; 423/606; 423/608; 423/610; 423/611; 423/622; 423/632; 423/635; 423/277
[58] Field of Search ............................... 423/335, 336, 423/325, 604, 605, 606, 608, 610, 611, 622, 632, 635, 277; 516/111, 112; 556/45, 54, 113, 130, 146, 179

[56] References Cited

U.S. PATENT DOCUMENTS

| | | |
|---|---|---|
| 2,269,059 | 1/1942 | McLachlan et al. . |
| 2,739,075 | 3/1956 | Iler . |
| 2,765,242 | 10/1956 | Alexander et al. . |

(List continued on next page.)

FOREIGN PATENT DOCUMENTS

| | | |
|---|---|---|
| 0 372 251 | 6/1990 | European Pat. Off. . |
| 0 684 642 | 11/1995 | European Pat. Off. . |
| 0 585 456 B1 | 7/1997 | European Pat. Off. . |
| 854 659 | 4/1940 | France . |
| 2 585 973 | 2/1987 | France . |
| 93/23333 | 11/1993 | WIPO . |
| 94/25149 | 11/1994 | WIPO . |
| 96/06051 | 2/1996 | WIPO . |
| 96/12683 | 5/1996 | WIPO . |
| 96/18456 | 6/1996 | WIPO . |
| 97/01508 | 1/1997 | WIPO . |
| 97/22652 | 6/1997 | WIPO . |

OTHER PUBLICATIONS

Egeberg et al., "Freeze Drying of Silica Gels Prepared from Siliciumethoxid", Revue De Physique Appliquee, pp. C4–23–C4–28 (Apr. 24, 1989).

Heley et al., "Fine Low Density Silica Powders Prepared by Supercritical Drying of Gels Derived from Silicon Tetrachloride'" Journal of Non–Crystalline Solids, vol. 186, pp. 30–36 (1995).

Kasraian et al., "Thermal Analysis of the Tertiary Butyl Alcohol–Water System and Its Implications on Freeze–Drying", Pharmaceutical Research, vol. 12, No. 4, pp. 484–490 (1995).

Klvana et al., "A New Method of Preparation of Aerogel––Like Materials Using a Freeze–Drying Process", Revue De Physique Appliquee, pp. C4–29–C4–32 (Apr. 1998).

Pajonk, "Drying Methods Preserving the Textural Properties of Gels", Revue De Physique Appliquee, pp. C4–13–C4–22 (Apr. 24, 1989).

Shioji, S. et al., "Surface Alkoxylation of Silicas by Mild Reactions with Alcohols" Bull. Chem. Soc. Jpn., 65(3), 728–734 (1992).

(List continued on next page.)

Primary Examiner—Steven P. Griffin
Assistant Examiner—Cam N. Nguyen

[57] ABSTRACT

A for producing metal oxide and/or organo-metal oxide compositions from metal oxide and organo-metal oxide precursors utilizing a rate modifying drying agent. The process allows metal oxide and/or organo-metal oxide compositions to be produced from a wide variety of metal oxide and organo-metal oxide precursors including metal halides and organometallic halides.

20 Claims, 3 Drawing Sheets

U.S. PATENT DOCUMENTS

| | | | |
|---|---|---|---|
| 2,832,794 | 4/1958 | Gordon | 260/448.2 |
| 2,901,460 | 8/1959 | Boldebuck | 260/46.5 |
| 3,652,214 | 3/1972 | Aboutboul et al. . | |
| 3,672,833 | 6/1972 | Teichner et al. | 23/182 R |
| 3,956,179 | 5/1976 | Sebestian et al. . | |
| 4,150,101 | 4/1979 | Schmidt et al. . | |
| 4,561,872 | 12/1985 | Luong et al. . | |
| 4,667,417 | 5/1987 | Graser et al. . | |
| 4,775,520 | 10/1988 | Unger et al. | 423/335 |
| 4,810,415 | 3/1989 | Winkelbauer et al. | 252/183.13 |
| 4,842,837 | 6/1989 | Takaaki et al. . | |
| 4,911,903 | 3/1990 | Unger et al. | 423/335 |
| 4,983,369 | 1/1991 | Barder et al. | 423/338 |
| 5,017,540 | 5/1991 | Sandoval et al. . | |
| 5,106,604 | 4/1992 | Agaskar | 423/335 |
| 5,158,758 | 10/1992 | Chieng et al. | 423/338 |
| 5,206,189 | 4/1993 | Caldwell | 501/12 |
| 5,275,796 | 1/1994 | Tillotson et al. | 423/338 |
| 5,326,738 | 7/1994 | Sandoval et al. . | |
| 5,376,449 | 12/1994 | Harris et al. . | |
| 5,391,364 | 2/1995 | Cogliati . | |
| 5,395,805 | 3/1995 | Droege et al. . | |
| 5,409,683 | 4/1995 | Tillotson et al. | 423/338 |
| 5,420,168 | 5/1995 | Mayer et al. . | |
| 5,647,962 | 7/1997 | Jonsen et al. . | |
| 5,746,992 | 5/1998 | Yoldas et al. . | |

OTHER PUBLICATIONS

Ballard, C.C. et al., "Esterification of the Surface of Amorphous Silica", Industrial and Biochemicals Department, E.I. du Pont de Nemours & Co, Inc., Wilmington, Delaware, 65, 20–25 (1961).

Heinrich et al., "Aerogels–Nanoporous Materials, Part I: Sol–Gel Process and Drying of Gels" *Journal of Porous Materials,* 1, 7–17 (1995).

Smith et al., "Preparation of Low–Density Xerogels at Ambient Pressure" *Journal of Non–Crystalline Solids 186,* 104–112 (1995).

Database WPI, Derwent Publications Ltd., London, GB, AN 86–098541, JP 61 044 711.

Database WPI, Derwent Publications Ltd., London, GB, An 87–104939, JP 62 052 119.

Database WPI, Derwent Publications Ltd., London, GB, AN 87–247982, JP 62 171 914.

*Patent Abstracts of Japan,* vol. 10, No. 235 (C–366), JP 61 068 314 (1986).

PROCESS FOR PRODUCING METAL OXIDE AND ORGANO-METAL OXIDE COMPOSITIONS

FIELD OF THE INVENTION

The present invention provides processes for producing metal oxide and organo-metal oxide compositions, including powders and gels.

BACKGROUND

Metal oxide and organo-metal oxide compositions, including gel compositions comprising metal oxide and/or organo-metal oxides, are utilized in a variety of applications including insulation; particulate additives, including flatting agents, thickeners, fillers and reinforcing agents; adsorbents; catalyst supports; membranes; filters; radiation detectors; coatings; and dielectrics. Metal oxide and organo-metal compositions which are utilized in these applications include, but are not limited to, oxides and organo-oxides of silicon, titanium, zirconium, aluminum, iron, magnesium, molybdenum, manganese, boron, copper, zinc, vanadium, tin, nickel, tantalum, niobium, lead, yttrium or mixtures thereof. The term organo-metal oxide refers to a composition comprising a metal oxide and an organic material (i.e. a material comprising $CH_x$ functionality) which may additionally comprise other chemical groups.

Metal oxide and organo-metal oxide compositions are produced in many forms depending on their intended application. The physical forms of metal oxides and organo-metal oxide solids include powders, whiskers, platelets and fibers.

As set forth above, metal oxide and organo-metal oxide compositions also include gels comprising a metal oxide and organo-metal oxide. The term "gel" encompasses wet gels, including hydrogels and alkagels; and gels dried from the wet gels including aerogels and xerogels. The term "aerogel" was coined by S. S. Kistler in U.S. Pat. No. 2,188,007 and is generally utilized to refer to a gel which has been dried under supercritical temperature/pressure conditions. Gels, in particular aerogels, are utilized in a wide variety of applications, including thermal and acoustic insulation, catalyst supports and carriers, filters and molecular sieves, rheology control agents, reinforcing agents, thickeners and electronics, as well as the applications listed above.

Metal oxide and organo-metal oxide compositions may be produced by the liquid phase hydrolysis of metal oxide and organo-metal oxide precursors. In conventional silica production processes a sodium silicate precursor is often utilized. However, it would be advantageous to have process for producing silica which achieves higher purity levels than processes utilizing sodium silicates. It would also be advantageous to have a process which could be utilized to make organo-metal oxides. It would further be advantageous to have a process which allowed for more control over metal oxide and/or organo-metal oxide properties (e.g. particle size, surface area, etc.) than processes utilizing sodium silicates.

Alkoxide precursors are also often utilized in silica production processes and processes for producing other metal oxide and organo-metal oxides. Alkoxide precursors, however, tend to be more expensive than metal chlorides, and may be disadvantageous for economic reasons. A problem which may arise in liquid phase metal oxide and organo-metal oxide production processes utilizing metal chloride or organometallic chloride precursors is that the high rate of the hydrolysis reaction makes it difficult to control the physical properties (size, surface area, etc.) of the metal oxide and organo-metal oxides produced. Thus alkoxide precursors are often employed, despite their generally higher cost, because alkoxide precursors generally allow more control over reaction rates and thereby make it easier to control the physical properties of the metal oxide and organo-metal oxides produced. It would be advantageous, however, to have a metal oxide and organo-metal oxide production process which could utilize metal chloride or organometallic chloride precursors due to their lower cost, but would still allow control over the physical properties of the metal oxide and organo-metal oxide particles produced.

The production of fine silica particles by the a liquid phase reaction process utilizing a silicon tetrachloride precursor and supercritical extraction has been reported. However, it would be advantageous to have a metal oxide and organo-metal oxide production process which could utilize metal chloride or organometallic chloride precursors and did not require the use of supercritical extraction.

Another problem which often arises in conventional processes for producing metal oxide and organo-metal oxide via the liquid phase hydrolysis of metal oxide and organo-metal oxide precursors is the formation of hard metal oxide and organo-metal oxide agglomerates during drying of the the metal oxide and organo-metal oxide. In addition, in conventional drying processes the metal oxide and organo-metal oxides may shrink during drying. The metal oxide and organo-metal oxides formed by such conventional processes may have tap densities higher than suitable for certain applications and may not be free flowing. Therefore, it would be advantageous to have a process for producing metal oxide and organo-metal oxide compositions which minimizes agglomeration and shrinkage and produces metal oxide and organo-metal oxide powders and gels having low tap densities.

SUMMARY OF THE INVENTION

The present invention provides processes for producing metal oxide and organo-metal oxide compositions, including treated metal oxide and organo-metal oxide compositions, and gel compositions via the liquid phase hydrolysis of metal oxide and organo-metal oxide precursors which overcome problems known in the art and may be utilized to produce free-flowing dry metal oxide and organo-metal oxide solids having low tap densities.

According to the present invention, a process for producing metal oxide and organo-metal oxide compositions comprises: hydrolyzing a metal oxide and/or organo-metal oxide precursor in the presence of a rate modifying drying agent to produce metal oxide and/or organo-metal oxide solids and drying the solids in the presence of the rate modifying drying agent.

As used in the description of the invention, metal oxide and/or organo-metal oxide solids comprise: powders, whiskers, platelets, flakes, fibers, granules, gels, mixtures thereof and other particulate matter.

An advantage of embodiments of a process of the present invention is that a single composition may be utilized as a rate modifying agent and a drying agent.

The processes of the present invention may advantageously utilize a wide range of precursors including metal halides and/or organometallic halides to produce different metal oxide and organo-metal oxide powders.

The processes of the present invention may also advantageously be utilized to produce both metal oxide and organo-metal oxide compositions and organically treated metal oxide and organo-metal oxide compositions.

The processes of the present invention also advantageously allow for control of the physical properties of the metal oxide and/or organo-metal oxide compositions produced through control of the process conditions.

Another advantage of the processes of the present invention is that the processes may be conducted as continuous processes.

A further advantage of the processes of the present invention is that the processes may achieve higher purity levels than conventional processes utilizing silicate precursors.

Yet another advantage of the processes of the present invention is that the processes may be more economic than conventional processes utilizing alkoxide precursors.

A further advantage of the processes of the present invention is that the processes may utilize metal chloride or organometallic chloride precursors, advantageous because of their lower cost, yet still allow control over the physical properties of the metal oxide and organo-metal oxide particles produced.

An additional advantage of the processes of the present invention is that the processes do not require the use of supercritical extraction.

A further advantage of the processes of the present invention is that the processes minimize agglomeration and/or shrinkage of the metal oxide and organo-metal oxide and may be utilized to produce metal oxide and organo-metal oxide powders and gels having low tap densities.

A further advantage of embodiments of the processes of the present invention is that hydrochloric acid produced as a by-product of the hydrolysis of a chloride containing precursor may be recovered in anhydrous form.

The features and advantages of the process of the present invention are described in more detail in the following sections.

DETAILED DESCRIPTION OF THE INVENTION

Figure 1:
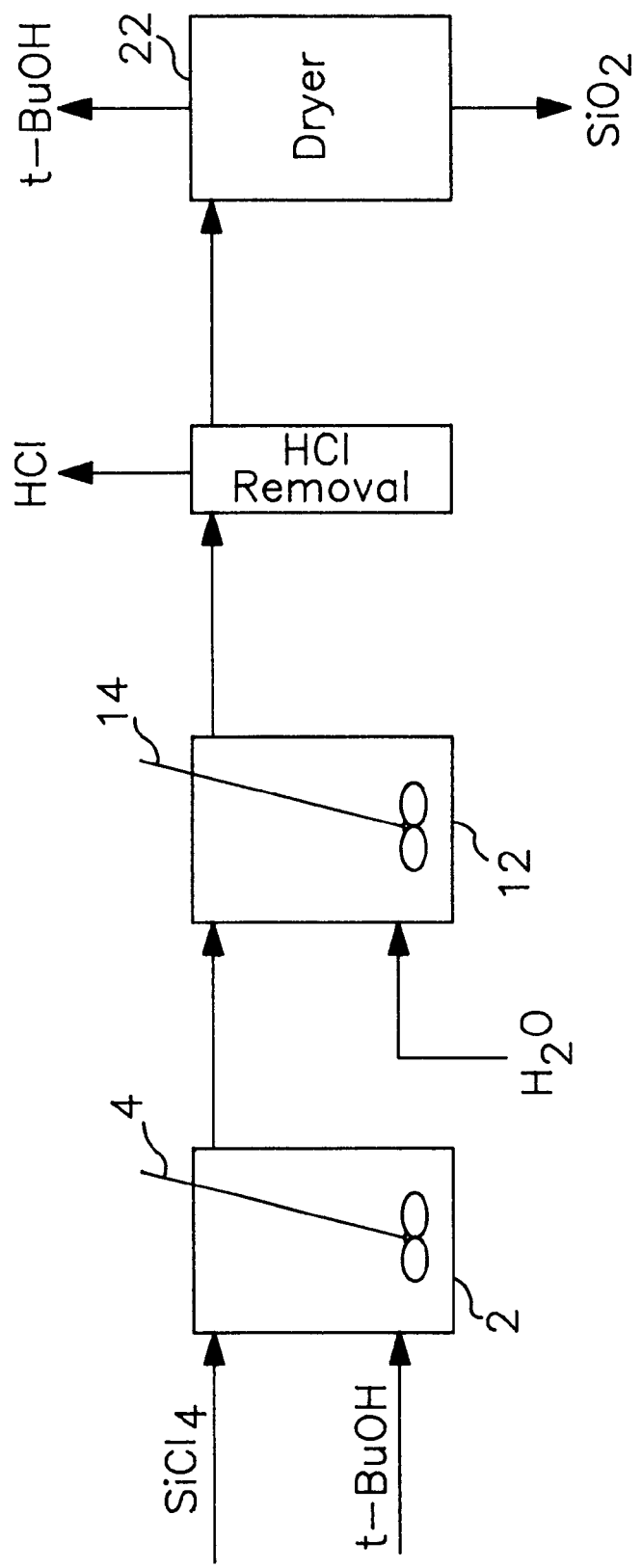
FIG. 1 is a schematic diagram of an embodiment of a process of the present invention for producing a metal oxide and/or organo-metal oxide composition.

According to the present invention, a process for producing metal oxide and organo-metal oxide compositions comprises: hydrolyzing a metal oxide and/or organo-metal oxide precursor in the presence of a rate modifying drying agent to produce metal oxide and/or organo-metal oxide solids and drying the solids in the presence of the rate modifying drying agent.

Preferred metal oxide and/or organo-metal oxide precursors are metal halides.

An embodiment of the process of the present invention comprises: hydrolyzing a metal oxide and/or organo-metal oxide precursor in the presence of a rate modifying drying agent to produce metal oxide and/or organo-metal oxide solids and drying the solids in the presence of the rate modifying drying agent, wherein the precursor comprises a metal halide.

Preferred products of the processes of the present invention have tap densities less than or equal to 1.0 grams per cubic centimeter (g/cc), preferably less than or equal to 0.4 g/cc, more preferably less than or equal to 0.2 g/cc.

Another embodiment of a process of the present invention comprises hydrolyzing a metal oxide and/or organo-metal oxide precursor in the presence of a rate modifying drying agent to produce metal oxide and/or organo-metal oxide solids and drying the solids in the presence of the rate modifying drying agent under drying conditions sufficient to produce dried metal oxide and/or organo-metal oxide solids having a tap density less than or equal to 1.0 grams per cubic centimeter (g/cc), preferably less than or equal to 0.4 g/cc, more preferably less than or equal to 0.2 g/cc. Preferably the tap density of the dried metal oxide and/or organo-metal oxide Cap Density) is less than or equal to 115%, more preferably less than or equal to 110%, more preferably less than or equal to 105% of the theoretical density of the metal oxide and/or organo-metal oxide in the reaction solution (Theoretical Density) as shown below:

(Tap Density/Theoretical Density)$\leq$115%, preferably $\leq$110%, more preferably $\leq$105%.

The processes of the present invention are advantageously performed at pressures less than or equal to 300 psia, preferably at a pressure of less than or equal to 100 psia, more preferably less than or equal to 30 psia, more preferably less than or equal to 16 psia A further embodiment of a process of the present invention comprises hydrolyzing a metal oxide and/or organo-metal oxide precursor in the presence of a rate modifying drying agent to produce metal oxide and/or organo-metal oxide solids and drying the solids in the presence of the rate modifying drying agent wherein the process is conducted at a pressure of less than or equal to 300 psia, preferably at a pressure of less than or equal to 100 psia, more preferably less than or equal to 30 psia, more preferably less than or equal to 16 psia.

The preferred embodiments of the processes of the present invention may be combined where desirable. For example, a further embodiment of a process of the present invention comprises hydrolyzing a metal oxide and/or organo-metal oxide precursor in the presence of a rate modifying drying agent to produce metal oxide and/or organo-metal oxide solids and drying the solids in the presence of the rate modifying drying agent under drying conditions sufficient to produce dried metal oxide and/or organo-metal oxide solids having a tap density less than or equal to 1.0 grams per cubic centimeter (g/cc), preferably less than or equal to 0.4 g/cc, more preferably less than or equal to 0.2 g/cc-metal oxide solids wherein the process is conducted at a pressure of less than or equal to 300 psia, preferably at a pressure of less than or equal to 100 psia, more preferably less than or equal to 30 psia, more preferably less than or equal to 16 psia As understood by those of ordinary skill in the art, and used herein, the term "hydrolyzing" refers to the process of hydrolysis, a chemical r eaction wherein water reacts with another substance to form two or more new substances that ionization of the water molecule as well as splitting of the compound hydrolyzed.

The processes of the present invention may be carried out utilizing conventional laboratory and industrial scale mixing vessels and equipment for handling metal oxide and organo-metal oxide compositions, including metal oxide and organo-metal oxide gels. The choice of the particular equipment utilized to practice the processes of the present invention is believed to be within the skill of one of ordinary skill in the art and therefore is not described in greater detail.

As will be recognized by one of ordinary skill in the art from the description and examples set forth herein, the processes of the present invention may be performed as continuous or batch processes.

As utilized herein, the term "rate modifying drying agent" refers to a composition which when present in the reaction solution: modifies the chemical reactions occurring in the solution to allow the physical properties of the metal oxide solids, or organo-metal oxide solids, or treated metal or organo-metal oxide solids to be controlled and allows the solids to be dried under conditions sufficient to produce dried metal oxide and/or organo-metal oxide solids having a tap density less than or equal to 0.2 grams per cubic centimeter (g/cc).

The chemical properties of the rate modifying drying agent of relevance to the process of the present invention include: ratio of liquid phase density to solid phase density at the freezing point ($\rho_{liquid}/\rho_{solid}$ ratio at the freezing point); vapor pressure at the freezing/melting point; heat of vaporization per volume; melting point; molecular weight; and water solubility. Suitable rate modifying drying agents for use in the processes of the present invention have:

a $\rho_{liquid}/\rho_{solid}$ ratio at the freezing point of 0.95–1.05, preferably 0.97–1.03; and a vapor pressure at the freezing/melting point of greater than or equal to 1 Torr, preferably greater than or equal to 10 Torr, more preferably greater than or equal to 25 Torr. Preferably a rate modifying drying agent for use in the process of the present invention additionally has one or more of the following properties:

a heat of vaporization per volume of less than 200 calories per cubic centimeter (cal/cc), preferably less than or equal to 125 cal/cc, more preferably less than or equal to 100 cal/cc ($\Delta H(cal/cc) \leq 200$, preferably $\leq 125$, more preferably $\leq 100$);

a melting point within 15° C., preferably within 5° C., of the temperature at which the drying is being conducted;

a molecular weight of less than or equal to 300, preferably less than or equal to 100; and/or water solubility (i.e. water is soluble/miscible in the rate modifying drying agent).

A further embodiment of a process of the present invention comprises hydrolyzing a metal oxide and/or organo-metal oxide precursor in the presence of a rate modifying drying agent to produce metal oxide and/or organo-metal oxide solids and drying the solids in the presence of the rate modifying drying agent wherein the rate modifying drying agent has a $\rho_{liquid}/\rho_{solid}$ ratio at the freezing point of 0.95–1.05, preferably 0.97–1.03; and/or a vapor pressure at the freezing/melting point of greater than or equal to 1 Torr, preferably greater than or equal to 10 Torr, more preferably greater than or equal to 25 Torr. In preferred embodiments, the rate modifying drying agent additionally has one or more of the following properties:

a heat of vaporization per volume of less than 200 calories per cubic centimeter (cal/cc), preferably less than or equal to 125 cal/cc, more preferably less than or equal to 100 cal/cc ($\Delta H$ (cal/cc) $\leq 200$, preferably $\leq 125$, more preferably $\leq 100$);

a melting point within 15° C., preferably within 5° C., of the temperature at which the drying is being conducted;

a molecular weight of less than or equal to 300, preferably less than or equal to 100; and/or water solubility (i.e. water is soluble/miscible in the rate modifying drying agent).

The vapor pressure at the freezing/melting point of a rate modifying drying agent relates to the rate at which the metal or organo-metal solids will dry. The sublimation (drying) rate is directly proportional to the vapor pressure at the solid-vapor interface. If the vapor pressure is to low, the drying rate is insufficient to maintain the interface temperature at or below the freezing rate. Preferred rate modifying drying agents for use in processes of the present invention have vapor pressures at their freezing/melting point of greater than or equal to 1 Torr, preferably greater than or equal to 10 Torr, more preferably, greater than or equal to 25 Torr.

The total amount of energy which must be input into a "wet" metal or organo-metal oxide to remove the liquid is directly proportional to the heat of vaporization per volume property of the rate modifying drying agent. Although, in processes of the present invention the vapor may be sublimed, the net energy is from the liquid to vapor phase change even though the process pathway may be liquid to solid to vapor. Preferred rate modifying drying agents for use in a process of the present invention have a heat of vaporization per volume property of less than or equal to 200 cal/cc, preferably less than or equal to 125 cal/cc, more preferably less than or equal to 100 cal/cc.

The melting point of a rate modifying drying agent will affect the temperature conditions at which the drying step of a process of the present invention is conducted. Preferably, the temperature conditions during drying are within 15° C., more preferably within 5° C. of the freezing/melting point of the rate modifying drying agent In order to ease processing, it is desirable that a process of the present invention be carried out near ambient temperature.

The molecular weight of a rate modifying drying agent will generally affect the rate modifying drying agent's freezing/melting point. When a rate modifying drying agent is in the pores of a metal oxide and organo-metal oxide, the freezing point decreases as the molecular weight of the solvent increases in an exponential fashion. Therefore, preferred rate modifying drying agents for use in a process of the present invention have molecular weights less than or equal to 300, preferably less than or equal to 100.

Although a rate modifying drying agent for use in the present invention need not be water soluble, it is preferred that water be at least partially miscible in the rate modifying drying agent and that the metal oxide precursor and/or organo-metal oxide precursor be at least partially miscible in the rate modifying drying agent.

Examples of rate modifying drying agents suitable for use in a process of the present invention are set forth in the following table. A preferred rate modifying drying agent for use in a process of the present invention is t-butanol ($\rho_{liquid}/\rho_{liquid}$ ratio at the freezing point of 1.00) due to its' high vapor pressure at the melting/freezing point in comparison to other rate modifying drying agents.

| Rate Modifying Drying Agent | V.P. at melting point (torr) | Melting Point (° C.) | ΔH (cal/mol) | MW | ΔH (cal/cm³) | Solubility in Rate Modifying Drying Agent (g H₂O/100 g) |
|---|---|---|---|---|---|---|
| t-butanol | 42 | 25.5 | 9330 | 74.1 | 99.3 | ∞ |
| CCl₄ | 8 | −23 | 7170 | 153.8 | 73.8 | ∞ |
| Formic Acid | 18 | 8 | 5240 | 46.0 | 139.6 | ∞ |
| 1,4 dioxane | 17 | 12 | 8690 | 88.1 | 101.9 | ∞ |
| t-butyl chloride | 25 | −25 | 6550 | 92.6 | 59.6 | very low |
| cyclohexane | 40 | 7 | 7160 | 84.1 | 66.3 | very low |
| p-xylene | 4 | 13 | 8500 | 122.2 | 59.9 | very low |
| acetic acid | 9 | 17 | 5660 | 60.1 | 98.8 | ∞ |

V.P.=vapor pressure; ΔH=Heat of Vaporization;
ΔH cal/cm³=heat of vaporization per volume;
MW=molecular weight Metal oxide and organo-metal oxide compositions which may be produced according to the processes of the present invention include, but are not limited to, metal oxide and organo-metal oxide compositions comprising the metal elements/oxides, and combinations of these elements/oxides listed in the Table below. Suitable precursors for producing the metal oxide and organo-metal oxides are also listed in the Table. Preferred

| Metal | Metal oxide acid organo-metal oxide Precursors | Examples of Forms as Metal oxide and organo-metal oxide |
|---|---|---|
| aluminum(Al) | AlCl₃, AlF₃ | Al₂O₃, AlN, Al₄C₃, Al(O)OH, Al(OH)₃ |
| boron(B) | BCl₃ | B₂O₃, BN, B₄C |
| copper (Cu) | CuCl₂, CuF₂ | CuO, Cu(OH)₂, Cu₃N |
| iron (Fe) | FeCl₂ | FeO, Fe₂O₃, Fe₃O₄, Fe₃C, Fe(OH)₂ |
| lead (Pb) | PbCl₂ | PbO, PbO₂ |
| magnesium (Mg) | MgCl₂ | MgO, Mg(OH)₂ |
| manganese (Mn) | MnCl₂, MnF₂ | MnO₂, Mn₃C, , Mn₂O₃, MnO₃ |
| molybdenum (Mo) | MOCl₂, MOCl₅, MoF₆ | MoO₂, Mo₂O₃, MoO₃, MoC, Mo₂C, Mo₂O₅ |
| nickel (Ni) | NiCl₂, NiF₂ | NiO, NiB, Ni₃C |
| niobium (Nb) | NbCl5, NbF5 | Nb₂O₅, NbB₂, NbC, NbN, NbO, NbO₂ |
| silicon (Si) | (CH₃)₂SiCl₂, (CH₃)₃SiCl | SiO₂, CH₃SiO₁.₅, SiC, Si₃N₄, (CH3)ₓSiO₂₋ₓ/₂ |
| tantalum (Ta) | TaCl₅, TaF₅ | Ta₂O₅, TaC, TaN |
| tin (Sn) | SnCl₄, | SnO, SnO₂ |
| titanium (Ti) | TiCl₄ | TiN, TiB₂, TiC TiO₂ |
| vanadium (V) | VOCl₃, VCl₄, VCl₃, | VC, V₂O₄, V₂O₅ |
| yttrium (Y) | YCl₃ | YC₂, Y(OH)₃, Y₂O₃ |
| zinc (Zn) | ZnF₂, ZnCl₂ | ZnO, Zn₃N₂ |
| zirconium (Zr) | ZrCl₄ | ZrC, ZrN, ZrO₂ |

Metal oxide and organo-metal oxide composite compositions, including but not limited to, mixtures of the above identified metal oxides may also be produced according to the process of the present invention.

The term organo-metal oxide refers to a composition comprising a metal oxide and an organic material (i.e. a material comprising $CH_x$ functionality) which may additionally comprise other chemical groups.

The listing of metals, metal oxide and organo-metal oxides, precursors and composites set forth above is not exhaustive. The process of the present invention may be utilized with other metal oxide and organo-metal oxide precursors known in the art and may be utilized to produce other metal oxide and organo-metal oxides.

In addition the processes of the present invention may be utilized to produce treated metal oxide and/or organo-metal oxide compositions. An embodiment of a process of the present invention for producing a treated metal oxide and/or organo-metal oxide composition comprises: hydrolyzing a metal oxide and/or organo-metal oxide precursor in the presence of a rate modifying drying agent and a treating agent to produce treated metal oxide and/or organo-metal oxide solids and drying the solids in the presence of the rate modifying drying agent.

Another embodiment of a process of the present invention comprises hydrolyzing a metal oxide and/or organo-metal oxide precursor in the presence of a rate modifying drying agent and a treating agent to produce treated metal oxide and/or organo-metal oxide solids and drying the solids in the presence of the rate modifying drying agent under drying conditions sufficient to produce dried treated metal oxide and/or organo-metal oxide solids having a tap density less than or equal to 1.0 grams per cubic centimeter (g/cc), preferably less than or equal to 0.4 g/cc, more preferably less than or equal to 0.2 g/cc. Preferably the tap density of the dried metal oxide and/or organo-metal oxide (Tap Density) is less than or equal to 115%, more preferably less than or equal to 110%, more preferably less than or equal to 105% of the theoretical density of the metal oxide and/or organo-metal oxide in the reaction solution (Theoretical Density) as shown below:

(Tap Density/Theoretical Density)≦115%, preferably≦110%, more preferably≦105%.

A further embodiment of a process of the present invention comprises hydrolyzing a metal oxide and/or organo-metal oxide precursor in the presence of a rate modifying drying agent and a treating agent to produce treated metal oxide and/or organo-metal oxide solids and drying the treated solids in the presence of the rate modifying drying agent wherein the process is conducted at a pressure of less than or equal to 300 psia, preferably at a pressure of less than or equal to 100 psia, more preferably less than or equal to 30 psia, more preferably less than or equal to 16 psia.

These embodiments of the processes of the present invention may be combined where desirable. For example, a further embodiment of a process of the present invention comprises hydrolyzing a metal oxide and/or organo-metal oxide precursor in the presence of a rate modifying drying agent and a treating agent to produce treated metal oxide and/or organo-metal oxide solids and drying the solids in the presence of the rate modifying drying agent under drying conditions sufficient to produce dried treated metal oxide and/or organo-metal oxide solids having a tap density less than or equal to 1.0 grams per cubic centimeter (g/cc), preferably less than or equal to 0.4 g/cc, more preferably less than or equal to 0.2 g/cc-metal oxide solids wherein the process is conducted at a pressure of less than or equal to 300 psia, preferably at a pressure of less than or equal to 100 psia, more preferably less than or equal to 30 psia, more preferably less than or equal to 16 psia under drying conditions sufficient to produce dried metal oxide and/or organo-metal oxide solids having a tap density less than or equal to 0.2 grams per cubic centimeter (g/cc), preferably less than or equal to 0.15 g/cc, more preferably less than or equal to 0.10 g/cc.

A further embodiment of a process of the present invention comprises hydrolyzing a metal oxide and/or organo-metal oxide precursor in the presence of a rate modifying drying agent and a treating agent to produce treated metal oxide and/or organo-metal oxide solids and drying the solids in the presence of the rate modifying drying agent wherein the rate modifying drying agent has a a $\rho_{liquid}/\rho_{solid}$ ratio at the freezing point of 0.95–1.05, preferably 0.97–1.03 and/or a vapor pressure at the freezing/melting point of greater than or equal to 1 Torr, preferably greater than or equal to 10 Torr, more preferably greater than or equal to 25 Torr. In preferred embodiments, the rate modifying drying agent additionally has one or more of the following properties:

- a heat of vaporization per volume of less than 200 calories per cubic centimeter (cal/cc), preferably less than or equal to 125 cal/cc, more preferably less than or equal to 100 cal/cc ($\Delta H$ (cal/cc)$\leq$200, preferably $\leq$125, more preferably $\leq$100);
- a melting point within 15° C., preferably within 5° C., of the temperature at which the drying is being conducted;
- a molecular weight of less than or equal to 300, preferably less than or equal to 100; and/or
- water solubility (i.e. water is soluble/miscible in the rate modifying drying agent).

Another embodiment of a process of the present invention for producing a treated metal oxide and/or organo-metal oxide composition comprises: hydrolyzing a metal oxide and/or organo-metal oxide precursor in the presence of a rate modifying drying agent to produce metal oxide and/or organo-metal oxide solids, reacting the solids with a treating agent to produce treated metal oxide and/or organo-metal oxide solids and drying the solids in the presence of the rate modifying drying agent. Preferred embodiments of this process may include the density, pressure and/or drying agent property conditions specified above.

A further embodiment of a process of the present invention for producing a treated metal oxide and/or organo-metal oxide composition comprises: hydrolyzing a metal oxide and/or organo-metal oxide precursor in the presence of a treating agent to produce treated metal oxide and/or organo-metal oxides solids in solution, exchanging the liquid phase of the solution with a rate modifying drying agent and drying the solids in the presence of the rate modifying drying agent under drying conditions sufficient to produce dried metal oxide and/or organo-metal oxide solids. Preferred embodiments of this process may include the density, pressure and/or drying agent property conditions specified above Suitable treating agents for use in the processes of the present invention include, but are not limited to, hexamethyldisilazane (HMDZ), trimethylchlorosilane (FMCS), esterification agents such as primary alcohols, alkanolamines and diols.

Additional treating agents include esterification agents. Esterification agents suitable for use in the processes of the present invention include chemical compositions which will react with the surface of the metal oxide and/or organo-metal oxide composition to esterify a portion of the surface of the metal oxide and/or organo-metal oxide composition, preferably esterifying at least 10% of the surface, more preferably esterifying at least 25% of the surface, even more preferably esterifying at least 45% of the surface.

Generally the esterification agent will comprise a carbon atom and a hydroxyl group bonded to the carbon atom. The hydroxyl group will react with surface groups on the metal oxide and/or organo-metal oxide composition to modify the surface of the metal oxide and/or organo-metal oxide. In the case of silica, it is believed that the hydroxyl group reacts with silanol groups on the silica surface as follows:

$$SiOH + ROH \leftrightarrow SiOR + H_2O.$$

As shown in the example esterification reaction above, after esterification a chemical group (R) from the esterification agent remains on the surface of the metal oxide and/or organo-metal oxide composition. Accordingly, where desired for a particular end use, a process of the present invention may be utilized to add chemical functionality to the surface of the resulting composition. For example, an esterification agent comprising allyl alcohol (discussed below) may be utilized to add vinyl functionality to the surface of the composition.

Suitable esterification agents include alcohols of the general formula ROH where R comprises an alkyl group or substituted alkyl group, including an alkylamine. The alcohol may comprise a primary alcohol, a secondary alcohol, a tertiary alcohol, and may further comprise halogen atoms, double bonds and/or an aromatic ring.

Suitable alcohols include methanol, ethanol, n-propanol, isopropanol, n-butanol, sec-butanol, isobutanol, terbutanol, n-hexanol, n-octanol, n-decanol, n-octadecyl alcohol, cyclohexanol, benyzyl alcohol, allyl alcohol and trifluoroethanol. Suitable alcohols also include alcohols comprising multiple hydroxyl groups (diols or polyols) for example, ethylene glycol, 1,2 propylene glycol, 1,3 propylene glycol, 1,4 butane diol, glycerol and diols with sulfur substitution such as 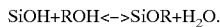 $HOC_2H_4S \cdot SC_2H_4OH$ and $HOC_2H_4S \cdot S \cdot S \cdot SC_2H_4OH$. Suitable esterification agents further include phenols, i.e. esterification agents wherein a hydroxyl group or groups is/are bound to a carbon atom or carbon atoms in an aromatic ring, for example phenol, o-cresol, m-cresol, p-cresol, catechol, resorcinol and hydroquinone.

Preferred alcohols include unbranched primary $C_1$–$C_4$ hydrocarbons, including methanol, ethanol, butanol and propanol.

The production of metal or organo-metal oxides and/or treated metal or organo-metal oxides via processes of the present invention may be accomplished utilizing a variety of process pathways which allow the physical form and physical properties of the metal or organo-metal, or treated metal or organo-metal, solids to be controlled.

An embodiment of a process of the present invention comprises:

- forming a solution comprising a metal oxide and/or organo-metal oxide precursor and a rate modifying drying agent;
- adding water to the solution to further hydrolysis reactions and the formation of metal oxide and/or organo-metal oxide solids;
- separating hydrolysis by-products ($H_x$—R) from the solution; and
- drying the metal oxide and/or organo-metal oxide solids underconditions sufficient to produce dried metal oxide and/or organo-metal oxide solids having a tap density less than or equal to 1.0 grams per cubic centimeter (g/cc), preferably less than or equal to 0.4 g/cc, more preferably less than or equal to 0.2 g/cc. The physical properties of the metal oxide and/or organo-metal oxide solids produced by the process may be controlled by: controlling the weight percentage of the precursor in the initial solution; controlling the rate of water addition; controlling the rate at which hydrolysis by-products are separated from the solution; and/or controlling the process temperature at which the hydrolysis reactions occur. Treated metal oxide and/or organo metal oxide compositions may be produced in the process by introducing a treating agent into the initial solution, introducing a treating agent with the water, and/or introducing a treating agent after water addition. When added after the initiation of hydrolysis, the introduction of the treating agent may be utilized to substantially stop, or reduce the rate of, the hydrolysis reaction occurring in the solution. The term hydrolysis by-products is utilized to refer to the composition, generally an acid, produced by the splitting to the precursor, for example HCl in the case of a metal chloride or organo-metal chloride precursor.

Another embodiment of a process of the present invention comprises:

forming a solution comprising a rate modifying drying agent and water;

adding a metal oxide and/or organo-metal oxide precursor to the solution to form metal oxide and/or organo-metal oxide solids through hydrolysis of the precursor;

separating hydrolysis by-products ($H_x$—R) from the solution; and drying the metal oxide and/or organo-metal oxide solids under conditions sufficient to produce dried metal oxide and/or organo-metal oxide solids having a tap density less than or equal to 1.0 grams per cubic centimeter (g/cc), preferably less than or equal to 0.4 g/cc, more preferably less than or equal to 0.2 g/cc. The physical properties of the metal oxide and/or organo-metal oxide solids produced by the process may be controlled by: controlling the amount, by weight, of the precursor added to the initial solution; controlling the rate of addition of the precursor; controlling the rate at which hydrolysis by-products are separated from the solution; and/or controlling the process temperature at which the hydrolysis reactions occur. Treated metal oxide and/or organo metal oxide compositions may be produced in the process by introducing a treating agent into the initial solution adding a treating agent to the solution comprising the precursor and/or adding a treating agent to the solution comprising metal oxide and/or organo-metal oxide solids (i.e. adding the treating agent after at least partial hydrolysis). When added after the initiation of hydrolysis, the introduction of the treating agent may be utilized to substantially stop, or reduce the rate of, the hydrolysis reaction occurring in the solution.

Further embodiments of the present invention include embodiments wherein the drying is conducted under the pressure conditions set forth above, and/or the rate modifying drying agent has the physical properties set forth above.

The amounts of metal oxide and/or organo-metal oxide precursor, water, treating agent (if utilized) and rate modifying drying agent utilized in the processes of the present invention may be determined utilizing molar ratios in the following manner, explained with reference to a metal halide precursor. The relative concentrations of water, the treating agent and the rate modifying drying agent to the halide precursor depends upon a number of factors. The amount of water required depends upon the ratio of halide atoms to metal atoms in the metal halide molecule. In general, one water molecule is require to hydrolyze each metal halide bond but water is also produced when twvo hydrolyzed metal species react to form a metal-oxygen-metal linkage and one water molecule. The minimum amount of water required to hydrolyze all of the halogen atoms is thus one-half of the total number of halogens. For example, for silicon tetrachloride ($SiCl_4$), two moles of water are required per mole of silicon tetrachloride. This fixes the minimum amount required the molar ratio of water to metal halide or organo-metal halide but the ratio may be higher to reduce residual halogen content in the oxide or to modify the structure (surface area, particle size, etc.) of the metal oxide. The amount of treating agent can vary from zero to concentrations on the same order of the metal halide depending upon the purpose and chemical nature of the treating agent. The amount of rate modifying drying agent used is typically given by the desired final density of the oxide. Since the rate modifying drying agent is the primary diluent, its removal upon drying and assuming no drying shrinkage occurs sets the lower limit on the density. Normally, the solids content of the reaction mass is specified on a final product basis as percent oxide mass per mass of reaction mass. Knowing the desired solids content (%S), and the mass yield when the halide is convert to the oxide, the amount of rate modifying drying agent can be calculated from:

$$\%S = \text{mass}_{metal\ halide} \times \text{mass yield}/(\text{mass}_{metal\ halide} + \text{mass}_{water} + \text{mass}_{rate\ modifying\ drying\ agent})$$

In processes of the present invention, after formation of metal oxide and/or organo-metal oxides, the solution comprising the rate modifying drying agent (or the rate modifying drying agent and the treating agent) is dried to produce a dry metal oxide and organo-metal oxide composition.

The drying of the metal oxide and organo-metal oxide may be accomplished utilizing a variety of process pathways. Preferably, the wet metal oxide and organo-metal oxide composition comprising metal oxide and organo-metal oxide solids and a rate modifying drying agent is placed in a drier at a temperature approximately equal to or above the freezing point of the rate modifying drying agent. Rapid hydrolysis may then be initiated by either establishing a vacuum or flowing a carrier gas by the sample. Preferably, the drying conditions are maintained such that the interface temperature of the vapor-liquid interface is rapidly cooled below the freezing point of the rate modifying drying agent. This causes the formation of a frozen "crust" in the metal oxide and organo-metal oxide solids which means that there are liquid-solid and solid-vapor interfaces but minimal or no liquid-vapor interfaces. Drying is continued by continued vapor removal. The temperature of the drier can even be increased as long as the temperature at the interface is maintained below the freezing point of the liquid. The interface temperature (assuming that the solid is completely saturated) is related to the rate of energy transport to the sample and the mass transfer of vapor away from the sample. At equilibrium, the interface temperature is the so-called wet bulb temperature and is calculated from:

$$h(T_{drier} - T_{wet\ bulb}) = DH\ kg(P_{drier} - P_{interface}) = DH\ kg\ (P_{drier} - F(T_{wet\ bulb}))$$

where:  
$h$ = heat transfer coefficient  
$T_{drier}$ = drier temperature  
$T_{wet\ bulb}$ = wet bulb temperature  
$DH$ = latent heat of vaporization -continued

| kg | = mass transfer coefficient |
| $P_{drier}$ | = partial pressure of solvent in drier |
| $P_{interface}$ | = vapor pressure of solvent at interface temperature $T_{wet\,bulb}$ |

In a process of the present invention the wet bulb temperature at the interface will preferably be lower than the drier temperature (the temperature of the environment in which the wet metal oxide and organo-metal oxide is being dried). As the partial pressure driving force increases, the temperature difference between the drier and the wet bulb temperature increases. The combination of the drying rate and the heat of vaporization should be sufficient to lower the interfacial temperature to the freezing point. In the later stages of drying, the drier temperature can be increased since increased heat and mass transfer resistance inside the solid allows higher drier temperature with an interface temperature which is still at the freezing point.

Another suitable method for performing the drying step is to dry the metal oxide and organo-metal oxide composition under a vacuum, a pressure of from approximately 0 psi to the vapor pressure of the drying agent at the rate modifying drying agent's freezing/melting point.

Another suitable method, which may be advantageous in a large scale production process, is to dry the metal oxide and organo-metal oxide utilizing a fluidized bed. In general, fluidized bed drying may be accomplished by placing the metal oxide and organo-metal oxide composition in a fluidized bed reactor and passing a dry inert (with respect to the metal oxide and organo-metal oxide composition) gas through the metal oxide and organo-metal oxide composition. The fluidization velocity, the gas stream velocity necessary to maintain fluidization, will depend on the physical characteristics and volume of the wet metal oxide and/or organo-metal oxide composition but should be sufficient to maintain fluidization. The temperature of the gas may be approximately ambient temperature, e.g. 16–25° C.

As set forth above, in an embodiment of a process according to the present invention, the dried metal oxide and/or organo-metal oxide will have a Tap Density less than or equal to 0.2 grams per cubic centimeter (g/cc), preferably less than or equal to 0.15 g/cc, more preferably less than or equal to 0.10 g/cc. Preferably the tap density of the dried metal oxide and/or organo-metal oxide (Tap Density) be less than or equal to 115%, more preferably less than or equal to 110%, more preferably less than or equal to 105% of the theoretical density of the metal oxide and/or organo-metal oxide in the reaction solution (Theoretical Density) as shown below:

(Tap Density/Theoretical Density)$\leq$115%, preferably$\leq$110%, more preferably$\leq$105%.

Tap Density and Theoretical Density may be determined in the manners set forth below.

After drying, the metal oxide and organo-metal oxide composition may be further processed in manners known to the art. For example, the metal oxide and organo-metal oxide composition may be milled or ground to produce a powder comprising the metal oxide and organo-metal oxide composition, or the metal oxide and organo-metal oxide composition may be heated to above the boiling point of the rate modifying drying agent to remove residual rate modifying drying agent.

In certain embodiments of processes of the present invention wherein a metal chloride is utilized as a precursor, hydrochloric acid (HCl) may be produced as a by-product of the hydrolysis reaction. An advantage of the process of the present invention is that in certain embodiments the HCl may be recovered in anhydrous form directly without the need for absorption/desorption and expensive processing equipment. The anhydrous form of HCl may be commercially valuable for use in other processes.

An embodiment of a process of the present invention for producing a metal oxide and organo-metal oxide is depicted schematically in FIG. 1. As shown in FIG. 1, a metal oxide and organo-metal oxide precursor, e.g. silicon tetrachloride (SiCl$_4$) and a rate modifying drying agent, e.g. t-butanol (t-BuOH) are combined in a reaction vessel, 2. Agitation means 4, may be utilized to ensure thorough mixing and contact between the precursor and the rate modifying drying agent.

The mixture of metal oxide and organo-metal oxide precursor and rate modifying drying agent may then be transferred to a second reaction vessel, 12, and water (H$_2$O) added to the vessel to further the hydrolysis reaction. Agitation means, 14, may also be utilized in the second reaction vessel to ensure contact between the constituents of the solution in the vessel.

Hydrochloric acid generated by the hydrolysis reaction may be removed via conventional means, for example flash separation. After the hydrolysis reaction is substantially complete, as may be determined by monitoring the amount of HCl produced, the reaction solution is transferred to a dryer, 22, wherein the metal oxide and/or organo-metal oxide product is separated (dried) from the solution.

Figure 2:
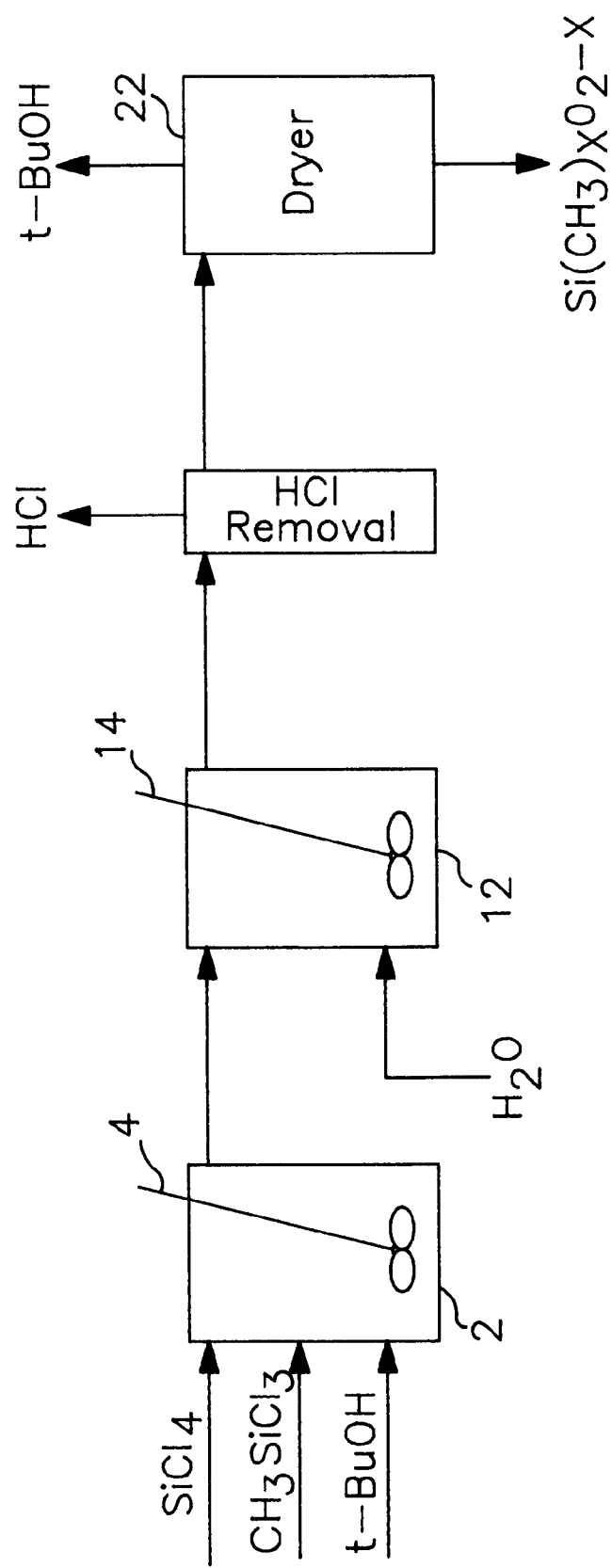
FIG. 2 is a schematic diagram of an embodiment of a process of the present invention for producing a treated metal oxide and/or organo-metal oxide composition.

An embodiment of a process of the present invention for producing a treated metal oxide and organo-metal oxide is depicted schematically in FIG. 2, which utilizes the same numerals as in FIG. 1 to describe similar apparatus. As shown in FIG. 2, a metal oxide and organo-metal oxide precursor, e.g. silicon tetrachloride (SiCl$_4$), a treating agent, e.g. MFCS, methyltrichlorosiliane (CH$_3$SiCl$_3$) and a rate modifying drying agent, e.g. t-butanol (t-BuOH) are combined in a reaction vessel, 2. Agitation means 4, may be utilized to ensure thorough mixing and contact between the precursor, treating agent and the rate modifying drying agent.

The mixture of metal oxide and organo-metal oxide precursor, treating agent and rate modifying drying agent may then be transferred to a second reaction vessel, 12, and water (H$_2$O) added to the vessel to further the hydrolysis reaction. Agitation means, 14, may also be utilized in the second reaction vessel to ensure contact between the constituents of the solution in the vessel.

Hydrochloric acid generated by the hydrolysis reaction may be removed via conventional means, for example flash separation. After the hydrolysis reaction is substantially complete, as may be determined by monitoring the amount of HCl produced, the reaction solution is transferred to a dryer, 22, wherein the treated metal oxide and/or organo-metal oxide product is separated (dried) from the solution.

Figure 3:
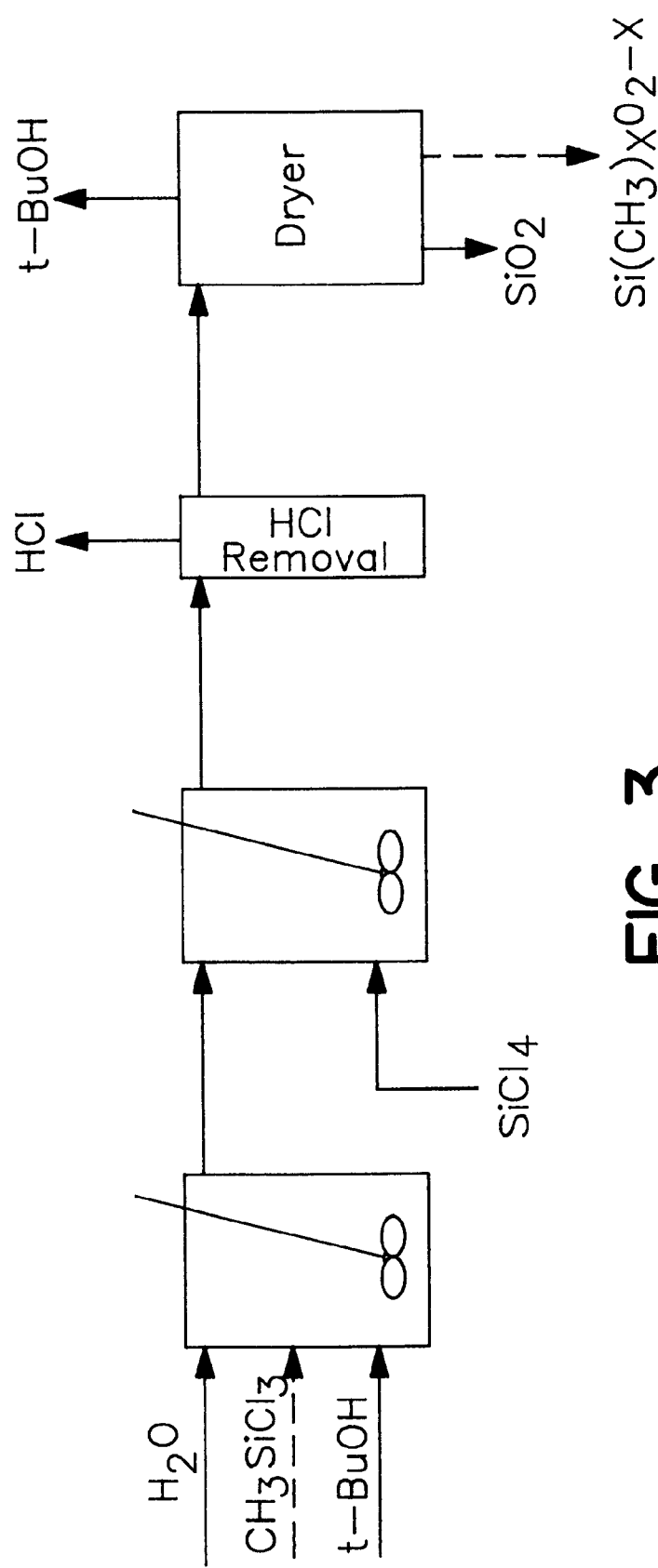
FIG. 3 is a schematic diagram of another embodiment of a process of the present invention.

FIG. 3 depicts alternative embodiments of processes of the present invention, utilizing the same numerals as FIGS. 1 and 2 to describe similar apparatus. As shown in FIG. 3 a rate modifying drying agent, e.g. t-butanol (t-BuOM), and water (H$_2$O) (or, a rate modifying drying agent, water and a a treating agent, e.g. MTCS, methyltrichlorosiliane (CH$_3$SiCl$_3$)) are combined in a reaction vessel, 2. Agitation means 4, may be utilized to ensure thorough mixing and contact between the water and the rate modifying drying agent (or the water, the rate modifying drying agent and the treating agent).

The mixture of water and rate modifying drying agent (or the mixture of water, rate modifying drying agent and treating agent) may then be transferred to a second reaction vessel, 12, and a metal oxide and organo-metal oxide precursor, e.g. silicon tetrachloride ($SiCl_4$) added to the vessel for hydrolysis. Agitation means, 14, may also be utilized in the second reaction vessel to ensure contact between the constituents of the solution in the vessel.

Hydrochloric acid generated by the hydrolysis reaction may be removed via conventional means, for example flash separation. After the hydrolysis reaction is substantially complete, as may be determined by monitoring the amount of HCl produced, the reaction solution is transferred to a dryer, 22, wherein the metal oxide and/or organo-metal oxide product (or treated metal oxide and/or organo-metal oxide product) is separated (dried) from the solution.

As will be understood by those of ordinary skill in the art, the process embodiments depicted schematically in FIGS. 1, 2 and 3 may be operated in a continuous fashion. The process embodiments depicted schematically in FIGS. 1, 2 and 3 may also be operated in batch mode, which would not require the use of separate reaction vessels. As will be recognized by those of ordinary skill in the art, and understood from the description included herein, successful implementation of the processes of the present invention may be accomplished through a variety of different process pathways.

Preferred products of the process of the present invent on include metal oxide and organo-metal oxide compositions which may be utilized for applications such as thermal and acoustic insulation; catalyst supports and carriers; filters and molecular sieves; rheology control agents; reinforcing agents; thickeners and electronics; adsorbents; flatting agents; particulate additives; membranes; filters; radiation detectors; coatings; and dielectrics and other applications set forth herein and/or known to those of ordinary skill in the art.

The following analytical procedures may be utilized to evaluate products of the present invention.

Determination of Tap Density

Tap density is determined by the following procedure. 1.0 g of the material was placed in an oven at 140° C. for 4–6 hours to remove physically bound water. The dried material was lightly ground to yield fine powder. About 0.1–1.0 g of the powder was then weighed out and poured into a 10 cc graduated measuring cylinder. The cylinder was lightly tapped 200 times all around in order to efficiently pack the material. The volume occupied by the material was noted. The tap density was obtained by dividing the weight of the material by the occupied volume.

Determination of Theoretical Density

The theoretical density refers to the density of a dried sample that would be obtained if there is no shrinkage and/or agglomeration of the sample during drying. The theoretical density is calculated from the solids content (weight percentage of the sample) in solution, the solid phase density of the sample and the liquid phase density of the liquid in the solution. In the case of a solution comprising a metal oxide or organo-metal oxide and a drying agent, the theoretical density would be as shown below:

$$\text{Theoretical Density} = \text{wt \%}_{oxide}/[\text{wt \%}_{oxide}/\rho_{solid} + (100 - \text{wt \%}_{oxide}/\rho_{drying\ agent})]$$

wherein:

wt $\%_{oxide}$ = the percent by weight of the oxide in the solution $\rho_{solid}$ = the solid phase density of the oxide $\rho_{drying\ agent}$ = the liquid phase density of the drying agent.

Surface Area

The surface area of the compositions may be determined utilizing ASTM test procedure D1993

Hydrophobicity

A determination of whether a composition is hydrophobic may be made utilizing the following technique.

Approximately 50 milliliters of deionized water are placed in a beaker at ambient temperature. Granules of the sample (powder or gel) to be tested are placed on the surface of the water. If the granules remain floating for more than 10 minutes, the sample is judged to be hydrophobic.

The features and advantages of the processes of the present invention are further described in the following Examples.

EXAMPLE 1

This example illustrates a process wherein an organo-metal chloride is added to a solution containing t-butanol and water.

This process was carried out in a fume hood with proper precautions. 5.4 ml of deionized $H_2O$ was added to 61.5 ml of t-butanol in a 1000 ml three necked reaction flask, and the solution was continuously stirred using a magnetic stirrer. The temperature of the solution was monitored using a thermocouple and was in the range of 20–25° C. Nitrogen gas was passed through the flask at the rate 1000 ml/min and bubbled at the outlet through a pH monitored water bath. 11.7 ml of methyltrichlorosilane (MTCS) was added dropwise to the solution. The ratio of water to silane was calculated to yield a molar ratio ($H_2O$:Si) of three. The amount of silane added was calculated to yield a 10 percent by weight product. Precipitation occurred almost instantly with the dropwise addition.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The tap density of this sample was 0.13 g/cm$^3$. The remaining dispersion was directly dried in the oven at 140° C. for 4–6 hours. This is a convection oven which will not achieve sufficient mass transfer and heat transfer rates required for the invention. This sample was referred to as 'oven dried' and had a density of 0.21 g/cm$^3$. The BET surface area of the samples were identical and equal to 10m$^2$/g. The results are reported in Table 1 below.

EXAMPLE 2

This example illustrates a process wherein an organo-metal chloride is first added to t-butanol, followed by the subsequent addition of water.

This process was carried out in a fume hood with proper precautions. 11.7 ml of methyltrichlorosilane (MFCS) was added to 61.5 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~3. 5.4 ml of H₂O was added dropwise to the solution. The ratio of water to silane was calculated to yield a nmolar ratio (H₂O:Si) of three. The amount of silane used was calculated to yield a 10 percent by weight product. After the temperature of the system came down to ambient, the pH of the water bath was ~1. A clear sol with pH ~1 resulted that was poured into a glass container and sealed. The glass container was then left at ambient conditions. The sol gelled within 15 hours.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The tap density of this sample was 0.16 g/cm³. The remaining dispersion was directly dried in the oven at 140° C. for 4–6 hours. This is a convection oven which will not achieve sufficient mass transfer and heat transfer rates required for the invention. This sample was referred to as 'oven dried' and had a density of 0.25 g/cm³. The BET surface area of the samples were similar and equal to 19 m²/g for the vacuum dried sample and 21 m²/g for the oven dried sample. The results are reported in Table 1 below.

EXAMPLE 3

This example illustrates a process wherein an organo-metal chloride is added to t-butanol without the use of water.

This process was carried out in a fume hood with proper precautions. 11.7 ml of methyltrichlorosilane was added to 68.3 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase upto ~60° C. was monitored accompanied with a bubbling reaction. After the temperature of the system came down to ambient, the pH of the water bath was ~3. A clear sol with a pH ~3 resulted that was poured into a glass container and sealed. The glass container was then left at ambient conditions. The sol did not gel within 96 h. This indicates the important role of water in the reaction and the invention.

subsequent addition of water using a lower mole ratio of water to silane.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~4. 3.6 ml of H₂O was added dropwise to the solution. The ratio of water to silane was calculated to yield a molar ratio (H₂O:Si) of twvo. The amount of silane used was calculated to yield a 10 percent by weight product After the temperature of the system came down to ambient, the pH of the water bath was ~2. A clear sol with pH ~2 resulted that was poured into a glass container and sealed. The glass container was then left at ambient conditions. The sol gelled within 15 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The tap density of this sample was 0.26 g/cm³. The remaining dispersion was directly dried in the oven at 140° C. for 4–6 hours. This is a convection oven which will not achieve sufficient mass transfer and heat transfer rates required for the invention. This sample was referred to as 'oven dried' and had a density of 0.32 g/cm³. The BET surface area of the vacuum dried sample was 17 m²/g. The results are reported in Table 2 below.

EXAMPLE 5

This example illustrates a process wherein a mixture of a metal chloride and an organo-metal chloride is first added to t-butanol, followed by the subsequent addition of water.

This process was carried out in a fume hood with proper precautions. 2.3 ml of tetrachlorosilane and 9.4 ml of methyltrichlorosilane were added to 63.8 ml of t-butanol in

TABLE 1

Examples using 100% methyltrichlorosilane as the organo-metal chloride source and a water to silane mole ratio of 3.

| Example | Solids Content, (wt %) | H₂O: Si Mole Ratio | Product | Tap Density, (g/cm³) | | BET Surface Area, (m²/g) | |
|---|---|---|---|---|---|---|---|
| | | | | Vacuum Dried | Oven Dried | Vacuum Dried | Oven Dried |
| 1 | 10 | 3 | Precipitated | 0.13 | 0.21 | 10 | 10 |
| 2 | 10 | 3 | Gel | 0.16 | 0.25 | 19 | 21 |
| 3 | 10 | 0 | Sol(no solid) | na | na | na | na | na = not applicable (liquid)

EXAMPLE 4

This example illustrates a process wherein an organo-metal chloride is first added to t-butanol, followed by the a 1000 ml three necked reaction flask, and the solution was continuously stirred using a magnetic stirrer. The temperature of the solution was monitored using a thermocouple.

Nitrogen gas was flown through the flask at the rate 1000 ml/min and bubbled at the outlet through a pH monitored water bath. The pH of the water was ~6. About 5–10 min after the complete tetrachlorosilane and methyltrichlorosilane addition, a rapid temperature increase up to ~60° C. was monitored accompanied with a bubbling reaction. After the temperature of the system came down to ambient, the pH of the water bath was ~3. 3.6 ml of $H_2O$ was added dropwise to the solution. The ratio of water to silane was calculated to yield a molar ratio ($H_2O$:Si) of two. The amount of silane used was calculated to yield a 10 percent by weight product. After the temperature of the system came down to ambient, the pH of the water bath was ~2. A clear sol with pH ~1 resulted that was poured into a glass container and sealed. The glass container was then left at ambient conditions. The sol gelled within 15 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The tap density of this sample was 0.60 g/cm$^3$. The remaining dispersion was directly dried in the oven at 140° C. for 4–6 hours. This is a convection oven which will not achieve sufficient mass transfer and heat transfer rates required for the invention. This sample was referred to as 'oven dried' and had a density of 0.54 g/cm$^3$. The BET surface area of the vacuum dried sample was 541 m$^2$/g. The results are reported in Table 2 below.

EXAMPLE 6

This example illustrates a process wherein a mixture of a metal chloride and an organo-metal chloride is first added to t-butanol, followed by the subsequent addition of water.

This process was carried out in a fume hood with proper precautions. 5.7 ml of tetrachlorosilane and 5.9 ml of methyltrichlorosilane were added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete tetrachlorosilane and methyltrichlorosilane addition, a rapid temperature increase up to ~60° C. was monitored accompanied with a bubbling reaction After the temperature of the system came down to ambient, the pH of the water bath was ~3. 3.6 ml of $H_2O$ was added dropwise to the solution. The ratio of water to silane was calculated to yield a molar ratio ($H_2O$:Si) of two. The amount of silane used was calculated to yield a 10 percent by weight product. After the temperature of the system came down to ambient, the pH of the water bath was ~2. A clear sol with pH ~1 resulted that was poured into a glass container and sealed. The glass container was then left at ambient conditions. The sol gelled within 15 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 Imillitorr. A liquid nitrogen trap was placed between the sample and the pump. The sample was dried for 30 minutes. The tap density of this sample was 0.64 g/cm$^3$. The remaining dispersion was directly dried in the oven at 140° C. for 4–6 hours. This is a convection oven which will not achieve sufficient mass transfer and heat transfer rates required for the invention. This sample was referred to as 'oven dried' and had a density of 0.60 g/cm$^3$. The BET surface area of the vacuum dried sample was 770 m$^2$/g and 745 m$^2$/g for the oven dried sample. The results are reported in Table 2 below.

EXAMPLE 7

This example illustrates a process wherein a metal chloride is first added to t-butanol, followed by the subsequent addition of water.

This process was carried out in a fume hood with proper precautions. 11.5 ml of tetrachlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete tetrachlorosilane and methyltrichlorosilane addition, a rapid temperature increase up to ~60° C. was monitored accompanied with a bubbling reaction. After the temperature of the system came down to ambient, the pH of the water bath was 3. 3.6 ml of $H_2O$ was added dropwise to the solution. The ratio of water to silane was calculated to yield a molar ratio ($H_2O$:Si) of two. The amount of silane used was calculated to yield a 10 percent by weight product. After the temperature of the system came down to ambient, the pH of the water bath was ~1. The sol gelled almost immediately during the addition of water.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The tap density of this sample was 0.79 g/cm$^3$. The remaining dispersion was directly dried in the oven at 140° C. for 4–6 hours. This is a convection oven which will not achieve sufficient mass transfer and heat transfer rates required for the invention. This sample was referred to as 'oven dried' and had a density of 0.75 g/cm$^3$. The BET surface area of the vacuum dried sample was 524 m$^2$/g . The results are reported in Table 2 below.

TABLE 2

Examples using mixtures of methyltrichlorosilane and silicon tetrachloride as the organo-metal chloride source and a water to silane mole ratio of 2.

| Example | Solids Content (wt %) | H$_2$O:Si molar ratio | CH$_3$SiCl$_3$:SiCl$_4$ molar ratio | Product | Tap Density, (g/cm$^3$) | | BET Surface Area, (m$^2$/g) | |
|---|---|---|---|---|---|---|---|---|
| | | | | | Vacuum Dried | Oven Dried | Vacuum Dried | Oven Dried |
| 4 | 10 | 2 | 100:0 | Gel | 0.26 | 0.32 | 17 | nd |
| 5 | 10 | 2 | 80:20 | Gel | 0.60 | 0.54 | 541 | nd |
| 6 | 10 | 2 | 50:50 | Gel | 0.64 | 0.60 | 770 | 745 |
| 7 | 10 | 2 | 0:100 | Gel | 0.79 | 0.75 | 524 | nd | nd = not determined

EXAMPLE 8

This example illustrates a process wherein an organo-metal chloride is first added to t-butanol, followed by the subsequent addition of basic water.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~2. 3.6 ml of 5M NH$_4$OH was added dropwise to the solution. The ratio of water to silane in the ammonium hydroxide solution was calculated to yield a molar ratio (H$_2$O:Si) of two. The amount of silane used was calculated to yield a 10 percent by weight product. After the temperature of the system came down to ambient, the pH of the water bath was ~1. A clear sol with pH ~1 resulted that was poured into a glass container and sealed. The glass container was then left at ambient conditions. The sol gelled within 24 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The remaining gel was directly dried in the oven at 140° C. for 4–6 hours. This is a convection oven which will not achieve sufficient mass transfer and heat transfer rates required for the invention. This sample was referred to as 'oven dried'. The BET surface area of the vacuum dried sample was 377 and the oven dried sample surface area was 357 m$^2$g. The results are reported in Table 3 below.

EXAMPLE 9

This example illustrates a process wherein an organo-metal chloride is first added to t-butanol, followed by the subsequent addition of basic water.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~2. 3.6 ml of 0.5 M NH$_4$OH was added dropwise to the solution. The ratio of water to silane in the ammonium hydroxide solution was calculated to yield a molar ratio (H$_2$O:Si) of two. The amount of silane used was calculated to yield a 10 percent by weight product. After the temperature of the system came down to ambient, the pH of the water bath was ~1. A clear sol with pH ~1 resulted that was poured into a glass container and sealed. The glass container was then left at ambient conditions. The sol gelled within 24 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes and the density was 0.17 g/cm$^3$. The remaining gel was directly dried in the oven at 140° C. for 4–6 hours. This is a convection oven which will not achieve sufficient mass transfer and heat transfer rates required for the invention. This sample was referred to as 'oven dried' and had a density of 0.10 g/cm$^3$. The BET surface area of the vacuum dried sample was 381 m$^2$/g. The results are reported in Table 3 below.

EXAMPLE 10

This example illustrates a process wherein an organo-metal chloride is first added to t-butanol, followed by the subsequent addition of basic water.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~2. 3.6 ml of 0.1 M NH$_4$OH was added dropwise to the solution. The ratio of water to silane in the ammonium hydroxide solution was calculated to yield a molar ratio (H$_2$O:Si) of two. The amount of silane used was calculated to yield a 10 percent by weight product. After the temperature of the system came down to ambient, the pH of the water bath was ~1. A clear sol with pH ~1 resulted that was poured into a glass container and sealed. The glass container was then left at ambient conditions. The sol gelled within 24 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes and the density was 0.23 g/cm$^3$. The remaining gel was directly dried in the oven at 140° C. for 4–6 hours. This is a convection oven which will not achieve sufficient mass transfer and heat transfer rates required for the invention. This sample was referred to as 'oven dried' and had a density of 0.20 g/cm$^3$. The BET surface area of the vacuum dried sample was 109 m/g. The results are reported in Table 3 below.

TABLE 3

Examples using methyltrichlorosilane as the organo-metal chloride source, a water to silane mole ratio of 2 and varying ammonia/silicon ratios

| Example | Solids Content, (wt %) | H$_2$O:Si Molar Ratio | NH$_3$:Si Molar Ratio | Tap Density, (g/cm$^3$) Vacuum Dried | Tap Density, (g/cm$^3$) Oven Dried | BET Surface Area, (m$^2$/g) Vacuum Dried | BET Surface Area, (m$^2$/g) Oven Dried |
|---|---|---|---|---|---|---|---|
| 8 | 10 | 2 | 0.180 | nd | nd | 377 | 357 |
| 9 | 10 | 2 | 0.018 | 0.17 | 0.10 | 381 | nd |
| 10 | 10 | 2 | 0.004 | 0.23 | 0.20 | 109 | nd | nd = not determined

EXAMPLE 11

This example illustrates a process wherein a mixture of a metal chloride and an organo-metal chloride is first added to t-butanol, followed by the subsequent addition of basic water.

This process was carried out in a fume hood with proper precautions. 2.3 ml of tetrachlorosilane and 9.4 ml of methyltrichlorosilane were added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/m in and bubbled at the outlet through a pH monitored water bath. The pH of the water was ~6. About 5–10 min after the complete tetrachlorosilane and methyltrichlorosilane addition, a rapid temperature increase up to ~60° C. was monitored accompanied with a bubbling reaction. After the temperature of the system came down to ambient, the pH of the water bath was ~3. 3.6 ml of 0.1 M NH$_4$OH was added dropwise to the solution. The ratio of water to silane in the ammonium hydroxide solution was calculated to yield a molar ratio (H$_2$O:Si) of two. The amount of silane used was calculated to yield a 10 percent by weight product. After the temperature of the system came down to ambient, the sol was poured into a glass container and sealed. The glass container was then left at ambient conditions. The sol gelled within 15 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes and the density was 0.65 g/cm$^3$. The remaining gel was directly dried in the oven at 140° C. for 4–6 hours. This is a convection oven which will not achieve sufficient mass transfer and heat transfer rates required for the invention. This sample was referred to as 'oven dried' and had a density of 0.60 g/cm$^3$. The BET surface area of the vacuum dried sample was 574 m$^2$/g. The results are reported in Table 4 below.

TABLE 4

Examples using methyltrichlorosilane and silicon tetrachloride as the organo-metal chloride source, a water to silane mole ratio of 2 and varying ammonia/silicon ratios.

| Example | Solids Content (wt %) | CH$_3$SiCl$_3$/SiCl$_4$ Molar Ratio | H$_2$O/Si Molar Ratio | NH$_3$/Si Molar Ratio | Tap Density, (g/cm$^3$) Vacuum Dried | Tap Density, (g/cm$^3$) Oven Dried | BET Surface Area, (m$^2$/g) Vacuum Dried | BET Surface Area, (m$^2$/g) Oven Dried |
|---|---|---|---|---|---|---|---|---|
| 11 | 10 | 80/20 | 2 | .004 | 0.65 | 0.60 | 574 | nd | nd = not determined

EXAMPLE 12

This example illustrates a process wherein an organo-metal chloride is first added to t-butanol, followed by the subsequent addition of water. To the resulting solution, a specified amount of acidic water is added.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~2. 3.6 ml of $H_2O$ was added dropwise to the solution. The ratio of water to silane was calculated to yield a molar ratio ($H_2O$:Si) of two. The amount of silane used was calculated to yield a 10 percent by weight product. After the temperature of the system came down to ambient, the pH of the water bath was ~1. A clear sol with pH ~1 resulted. 21 ml of this sol was poured into a glass container and magnetically stirred. 22.1 ml of concentrated HCl reagent was added dropwise. A weakly gelatinous precipitate resulted.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The remaining gel was directly dried in the oven at 140° C. for 4–6 hours. This is a convection oven which will not achieve sufficient mass transfer and heat transfer rates required for the invention. This sample was referred to as 'oven dried'. The BET surface area of the vacuum dried sample was 7 $m^2/g$. The results are reported in Table 5 below.

EXAMPLE 13

This example illustrates a process wherein a mixture of a metal chloride and an organo-metal chloride is first added to t-butanol, followed by the subsequent addition of water. To the resulting solution, a specified amount of acidic water is added.

This process was carried out in a fume hood with proper precautions. 2.3 ml of tetrachlorosilane and 9.4 ml of methyltrichlorosilane were added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/m in and bubbled at the outlet through a pH monitored water bath. The pH of the water was ~6. About 5–10 min after the complete tetrachlorosilane and methyltrichlorosilane addition, a rapid temperature increase upto ~60° C. was monitored accompanied with a bubbling reaction. After the temperature of the system came down to ambient, the pH of the water bath was ~3. 3.6 ml of $H_2O$ was added dropwise to the solution. The ratio of water to silane was calculated to yield a molar ratio ($H_2O$:Si) of two. The amount of silane used was calculated to yield a 10 percent by weight product. After the temperature of the system came down to ambient, the pH of the water bath was ~2. A clear sol with pH ~1 resulted and 21 ml of this sol was poured into a glass container and magnetically stirred. 22.1 ml of concentrated HCl reagent was added dropwise. A weakly gelatinous precipitate resulted.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The remaining gel was directly dried in the oven at 140° C. for 4–6 hours. This is a convection oven which will not achieve sufficient mass transfer and heat transfer rates required for the invention. This sample was referred to as 'oven dried'. The BET surface area of the oven dried sample was 446 $m^2/g$. The results are reported in Table 5 below.

TABLE 5

Examples using methyltrichlorosilane and silicon tetrachloride as the organo-metal chloride source, a water to silane mole ratio of 2 and acid addition.

| Example | Solids Content, (wt %) | $H_2O$:Si Molar Ratio | $CH_3SiCl_3$:$SiCl_4$ molar ratio | Tap Density, (g/cm³) Vacuum Dried | Tap Density, (g/cm³) Oven Dried | BET Surface Area, (m²/g) Vacuum Dried | BET Surface Area, (m²/g) Oven Dried |
|---|---|---|---|---|---|---|---|
| 12 | 10 | 2 | 100/0 | nd | nd | 7 | nd |
| 13 | 10 | 2 | 80/20 | nd | nd | 446 | nd | nd = not determined

EXAMPLE 14

This example illustrates a process wherein an organo-metal chloride is first added to t-butanol to form a solution mixture. The solution is subsequently added to water.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~2. The sol was transferred from the flask into a glass container. 3.6 ml of $H_2O$ was added to the empty reaction flask and magnetically stirred. The sol from the glass container is added dropwise to the $H_2O$. After the temperature of the system came down to ambient, the sol was poured into a glass container, sealed and left at ambient conditions. The sol gelled within 15 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes and had a tap density of 0.24 $g/cm^3$. The remaining gel was directly dried in the oven at 140° C. for 4–6 hours. This is a convection oven which will not achieve sufficient mass transfer and heat transfer rates required for the invention. This sample was referred to as 'oven dried' and had a density of 0.34 $g/cm^3$. The BET surface area of the oven dried sample was 316 $m^2/g$. The results are reported in Table 6 below.

EXAMPLE 15

This example illustrates a process wherein an organo-metal chloride is first added to t-butanol to form a solution mixture. The solution is subsequently added to basic water.

This process was carried out in a fume hood with proper precautions. 11.7 ml of methyltrichlorosilane was added to 63.8 ml of t-butanol in a 1000 ml three necked reaction flask, and the solution was continuously stirred using a magnetic stirrer. The temperature of the solution was monitored using a thermocouple. Nitrogen gas was flown through the flask at the rate 1000 ml/min and bubbled at the outlet through a pH monitored water bath. The pH of the water was ~6. About 5–10 min after the complete methyltrichlorosilane addition, a rapid temperature increase up to ~60° C. was monitored accompanied with a bubbling reaction. After the temperature of the system came down to ambient, the pH of the water bath was ~2. The sol was transferred from the flask into a glass container. 3.6 ml of 0.5 M $NH_4OH$ was added to the empty reaction flask and magnetically stirred. The sol from the glass container is added dropwise into the reaction flash After the temperature of the system came down to ambient, the sol was poured into a glass container, sealed and left at ambient conditions. The sol gelled within 15 h.

A portion of the wet product was vacuum dried, and subsequently dried in an oven (with an exhaust fume hood) at 140° C. for 4–6 hours. This sample was referred to as 'vacuum dried'. For vacuum drying, the sample was placed in a sample tube and opened to a mechanical vacuum pump with an ultimate pressure of 0.01 millitorr. A liquid nitrogen trap was placed between the sample and the pump. The sample was dried for 30 minutes. The remaining gel was directly dried in the oven at 140° C. for 4–6 hours. This is a convection oven which will not achieve sufficient mass transfer and heat transfer rates required for the invention. This sample was referred to as 'oven dried'. The BET surface area of the vacuum dried sample was 12 $m^2/g$ . The results are reported in Table 6 below.

TABLE 6

Examples using methyltrichlorosilane as the organo-metal chloride source, a water to silane mole ratio of 2 and basic water.

| Example | Solids Content, (wt %) | $H_2O$:Si Molar Ratio | $NH_3$:Si Molar Ratio | Tap Density, ($g/cm^3$) Vacuum Dried | Tap Density, ($g/cm^3$) Oven Dried | BET Surface Area, ($m^2/g$) Vacuum Dried | BET Surface Area, ($m^2/g$) Oven Dried |
|---|---|---|---|---|---|---|---|
| 14 | 10 | 2 | 0 | 0.24 | 0.34 | 316 | nd |
| 15 | 10 | 2 | 0.018 | nd | nd | 12 | nd | nd = not determined

EXAMPLE 16

This example illustrates a process wherein water is directly added to an organo-metal chloride.

This process was carried out in a fume hood with proper precautions. 3.6 ml of $H_2O$ was added dropwise to 11.7 ml of methyltrichlorosilane being magnetically stirred. Precipitation occurred almost immediately upon $H_2O$ addition. The wet precipitate was directly dried in an oven at 140° C. for 4–6 hours. This sample is referred to as 'oven dried'. The results are reported in Table 7 below.

EXAMPLE 17

This example illustrates a process wherein water is directly added to a mixture of metal chloride and organo-metal chloride.

This process was carried out in a fume hood with proper precautions. 3.6 ml of $H_2O$ was added dropwise to a mixture of 2.3 ml of tetrachlorosilane and 9.4 ml of methyltrichlorosilane being magnetically stirred. Precipitation occurred almost immediately upon $H_2O$ addition. The wet precipitate was directly dried in an convection oven at 140° C. for 4–6 hours. This sample is referred to as 'oven dried'. The results are reported in Table 7 below.

EXAMPLE 18

This example illustrates a process wherein an organo-metal chloride is directly added to water.

This process was carried out in a fume hood with proper precautions. 4.0 ml of methyltrichlorosilane was added dropwise to 100 ml of $H_2O$ being magnetically stirred. Precipitation occurred almost immediately upon the methyltricblorosilane addition. The wet precipitate was directly dried in an convection oven at 140° C. for 4–6 hours. This sample is to as 'oven dried'. The results are reported in Table 7 below.

EXAMPLE 19

This example illustrates a process wherein water is first added to t-butanol. This mixture is subsequently added to an organo-metal chloride.

This process was carried out in a fume hood with proper precautions. 3.6 ml of $H_2O$ added to 63.8 ml of t-butanol being continuously magnetically stirred. This homogeneous mixture is then added dropwise to 11.7 ml of methyltrichlorosilane being magnetically stirred. Precipitation from the methyltrichlorosilane occurred even before the complete addition of the water plus t-butanol mixture. The precipitate was directly dried in an convection oven at 140° C. for 4–6 hours. This sample is referred to as 'oven dried'. The results are reported in Table 7 below.

TABLE 7

Examples using methyltrichlorosilane/silicon tetrachloride mixtures as the organo-metal chloride source, a water to silane mole ratio of 2 and adding directly to water

| Example | Solids Content, (wt %) | $H_2O$/Si Molar Ratio | $CH_3SiCl_3$/$SiCl_4$ Molar Ratio | Product | BET Surface Area, (m²/g) |
|---------|------------------------|----------------------|-----------------------------------|-------------|--------------------------|
| 16      | 62.5                   | 2                    | 100/0                             | Precipitate | 5                        |
| 17      | 62.5                   | 2                    | 80/20                             | Precipitate | 51                       |
| 18      | 2                      | 163                  | 100/0                             | Precipitate | 3                        |
| 19      | 10                     | 2                    | 100/0                             | Precipitate | 11                       |

EXAMPLE 20

This example illustrates a process wherein an organo-metal chloride is added dropwise to basic water.

This process was carried out in a fume hood with proper precautions. 2.0 ml of methyltrichlorosilane was added dropwise to 11.1 ml of concentrated $NH_4OH$ being magnetically stirred. Precipitation occurred and the pH of the slurry was ~11. The wet precipitate was directly dried in an oven at 140° C. for 4–6 hours. The tap density of this sample is 0.37 g/cc and the BET surface area is 2 m²/g.

EXAMPLE 21

This example illustrates a process wherein an organo-metal chloride is added dropwise to acidic water.

This process was carried out in a fume hood with proper precautions. 2.0 ml of methyltrichlorosilane was added dropwise to 20 ml of concentrated HCl being magnetically stirred. The wet precipitate was directly dried in an oven at 140° C. for 4–6 hours. The tap density of this sample is 0.22 g/cc and the BET surface area is 14 m²/g.

EXAMPLE 22

This example illustrates a process wherein an organo-metal chloride is added dropwise to a mixture of t-butanol and basic water.

This process was carried out in a fume hood with proper precautions. 56.0 ml of t-butanol was added to 11.1 ml of concentrated $NH_4OH$ and magnetically stirred. The pH of this mixture was ~11. To this mixture 11.7 ml of methyltrichlorosilane is added dropwise. Precipitation occurred and the pH of the slurry was ~1. The wet precipitate was directly dried in an oven at 140° C. for 4–6 hours. The tap density of this sample is 0.44 g/cc and the BET surface area is 21 m²/g.

It should be clearly understood that the forms of the present invention herein described are illustrative only and are not intended to limit the scope of the invention.

What is claimed is:

1. A process for producing a metal oxide or an organo-metal oxide composition comprising hydrolyzing a metal oxide and/or organo-metal oxide precursor in the presence of a rate modifying drying agent having a vapor pressure at its freezing/melting point greater than or equal to 1 Torr to produce metal oxide and/or organo-metal oxide solids and drying the solids in the presence of the rate modifying drying agent at a pressure less than or equal to 300 psia and at a temperature within 15 degrees Celsius of the freezing/melting point of the rate modifying drying agent, wherein the metal oxide and/or organo-metal oxide precursor comprises a metal halide or organo-metal halide.

2. The process of claim 1 wherein the drying conditions are sufficient to produce dried metal oxide and/or organo-metal oxide solids having a tap density less than or equal to 1.0 grams per cubic centimeter (g/cc).

3. The process of claim 1 wherein the process is conducted at a pressure of less than or equal to 300 psia.

4. The process of claim 1 wherein the $\rho_{liquid}/\rho_{solid}$ ratio of the rate modifying drying agent is 0.95 to 1.05.

5. The process of claim 4 wherein the vapor pressure at the freezing/melting point of the rate modifying drying agent is greater than or equal to 1 Torr.

6. The process of claim 1 wherein the precursor comprises a metal halide.

7. The process of claim 1 wherein the rate modifying drying agent is t-butanol.

8. The process of claim 1 wherein the precursor comprises a silicon-chloride.

9. The process of claim 1 wherein the dried metal oxide comprises silica.

10. The process of claim 1 wherein the physical form of the dried metal oxide is a powder, a whisker, a platelet, a fiber, a flakes a granule, or mixtures thereof.

11. The process of claim 1 wherein the physical form of the dried metal oxide is a gel.

12. The process of claim 1 comprising hydrolyzing said metal oxide and/or organo-metal oxide precursor in the presence of said rate modifying drying agent and a treating agent selected from the group consisting of alcohols.

13. The process of claim 12 wherein the drying conditions are sufficient to produce dried treated metal oxide and/or organo-metal oxide solids having a tap density less than or equal to 1.0 grams per cubic centimeter (g/cc).

14. The process of claim 12 wherein the process is conducted at a pressure of less than or equal to 300 psia.

15. The process of claim 12 wherein the $\rho_{liquid}/\rho_{solid}$ ratio at the freezing of the rate modifying drying agent is 0.95 to 1.05.

16. The process of claim 15 wherein the vapor pressure at the freezing/melting point of the rate modifying drying agent is greater than or equal to 1 Torr.

17. The process of claim 12 wherein the precursor comprises a metal halide.

18. The process of claim 12 wherein the rate modifying drying agent is t-butanol.

19. The process of claim 12 wherein the hydrolysis reaction creates anhydrous HCl and the process further includes means for separating and collecting the anhydrous HCl.

20. The process of claim 1 wherein the hydrolysis reaction creates anhydrous HCl and the process further includes means for separating and collecting the anhydrous HCl.

* * * * *